July 12, 1960

W. HAMMESFAHR 2,944,865

ASH-TRAYS FOR VEHICLES

Filed Sept. 16, 1958

INVENTOR.
Willy Hammesfahr
BY

July 12, 1960 W. HAMMESFAHR 2,944,865
ASH-TRAYS FOR VEHICLES
Filed Sept. 16, 1958 2 Sheets-Sheet 2
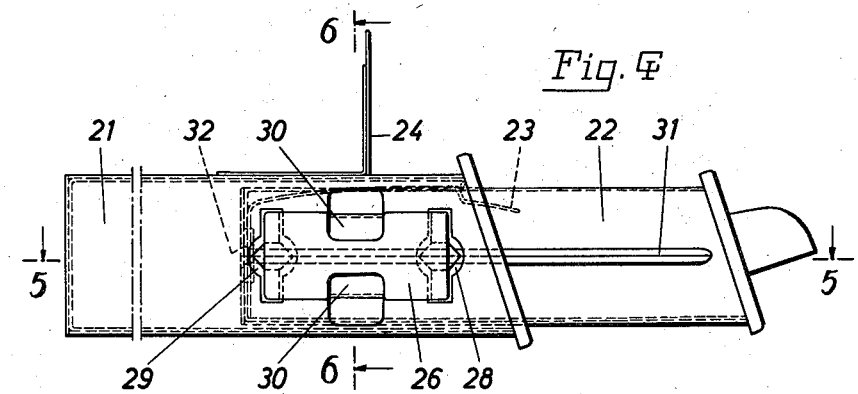
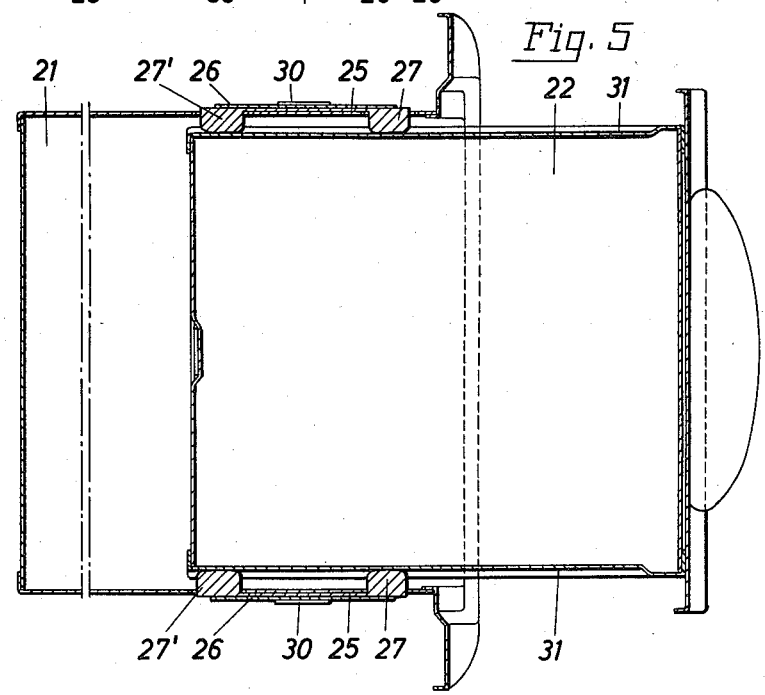
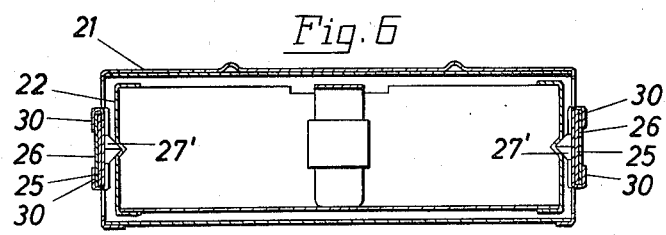
INVENTOR.
Willy Hammesfahr
BY

United States Patent Office 2,944,865
Patented July 12, 1960

2,944,865
ASH-TRAYS FOR VEHICLES

Willy Hammesfahr, Solingen-Wald, Germany, assignor to Firma Gebr. Happich G.m.b.H., Wuppertal-Elberfeld, Germany, a corporation of Germany Filed Sept. 16, 1958, Ser. No. 761,357

Claims priority, application Germany Nov. 16, 1957

5 Claims. (Cl. 312—341)

The present invention relates to an ash-tray particularly for motor vehicles, wherein the ash-tray is guided in a housing secured to the car body or to the dashboard of the vehicle. Such ash-trays are known as drawer ash-trays, as well as tipping ash-trays.

In order to bring about a favorable movability of the ash-tray, it has been proposed to guide the same spaced apart from the walls of the housing for the ash-tray. As guide means were provided, for instance, rollers disposed on the housing walls, which project into guide grooves of the ash-tray. Such roller-guide requires proper service, however. It does not permit a resilient engagement between the rollers and the ash-tray, unless the entire ash-tray housing is made of resilient material which is not favorable for the manufacture of such housings.

In order to eliminate the necessity of service of such guide means, it has also been proposed to provide spring tongues which project from the material of the housing walls, which are pressed with their wide faces against the wall of the ash tray. Such arrangement, however, requires again a material which is very expensive and difficult to work. The latter must be adjusted always to the spring force desirable for the tongues.

It is further known to use a material for guiding the ash-tray, which is independent from the material of the ash-tray housing. These known arrangements have guide projections which run along the upper edge of the ash-tray and are made, for instance, of textile material. These guide means are secured to the ash-tray housing and mount simultaneously the ash-tray by surrounding, for instance, the guide members with angular members of U-profile. The arrangement of such guide members, disposed along the entire length of the ash-tray, does not permit the exertion of a pre-determined spring force on the ash-tray. On the other hand, such spring force is favorable for achieving an equally good movability of the ash-tray. At the same time, any intermediate position of the ash-tray may be obtained in favorable manner. A guide which operates with simultaneous spring pressure brings about also a vibration-free holding of the ash-tray.

It is, therefore, one object of the present invention to provide an ash-tray wherein the ash-tray is continuously well guided by means of a plurality of guide projections, which may be provided in simplest manner and which projections are longitudinally spaced apart from each other, whereby the engagement pressure of the projections towards the ash-tray is independent from the material of the ash-tray housing and may be selected at will.

It is another object of the present invention to provide an ash-tray wherein a resilient plate of artificial material is formed at its free end to nose portions which operate as guide projections and which plate is clamped at its center portion to the wall of the ash-tray housing.

By arranging of a plate of artificial material independently from the ash-tray housing and secured to the latter in simplest manner, which plate forms the guide projections integrally, a particularly favorable construction of the ash-tray arrangement is brought about not only as to its manufacture, but also as to its required service. By proper clamping of the center portion of the plate, an optimum use of the resiliency of the material is obtained in simplest manner. All desirable advantages are achieved by the mounting of a single part which is independently manufactured. The self-lubricating characteristic of the artificial material assures the use for an appreciably long time with equally good guide of the ash-tray. Furthermore, a replacement of a used plate of artificial material is also possible in the simplest manner.

It is also another object of the present invention to provide an ash-tray arrangement, wherein the nose portion of the plate of artificial material disposed on the outside of the wall of the housing projects through the wall of the housing. The outside mounting of the plate of artificial material simplifies its accessibility during the mounting thereof. It reduces also its size necessary for the ash-tray housing.

A favorable design is obtained, in accordance with the present invention, furthermore, by the arrangement that the outside mounting of the plate of artificial material is brought about by flanges cut out of the side wall of the ash-tray housing.

In order to achieve the greatest possible spring force, particularly to a great degree independently from the artificial material to be chosen, the plate of artificial material is advantageously engaging the ash-tray by means of a spring plate, thus providing a pre-tension, since the spring plate engages the back-side of the plate of artificial material.

A comparatively great pressure force may be necessary, particularly in use of larger ash-trays. It is not required to choose a larger plate of artificial material, if, by using a spring plate which engages the plate of artificial material, the engagement force is increased.

A particularly favorable design as to its manufacture and its effect is brought about in accordance with the present invention, by an arrangement according to which the holding flanges cut out from the side wall of the ash-tray housing, secure simultaneously the spring plate. The free ends of the spring plate can transfer their spring force without any interference onto the nose portions disposed on the plate of artificial material, and thereby onto the ash-tray.

With these and other objects in view which will become apparent in the following detailed description, the present invention will be clearly understood in connection with the accompanying drawings, in which:

Fig. 4 is a side elevation of another embodiment of the ash-tray, wherein a spring blade supports the self-lubricating plate of artificial material;

Fig. 5 is a section along the lines 5—5 of Fig. 4; and

Fig. 6 is a section along the lines 6—6 of Fig. 4.

Figure 1:
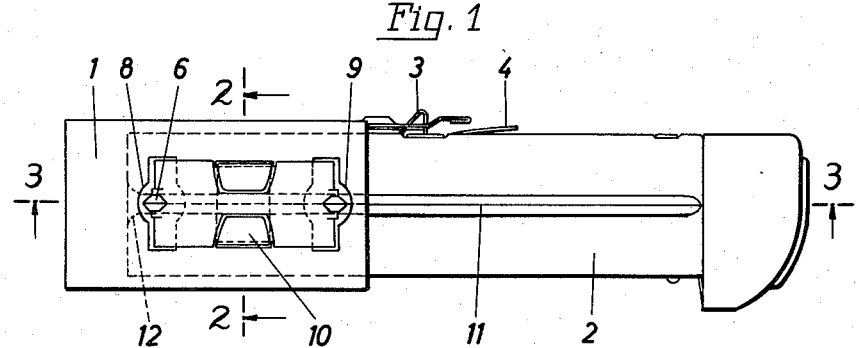
Figure 1 is a side elevation of an ash-tray which is equipped with a plate of self-lubricating material having guiding nose portions.
Figure 3:
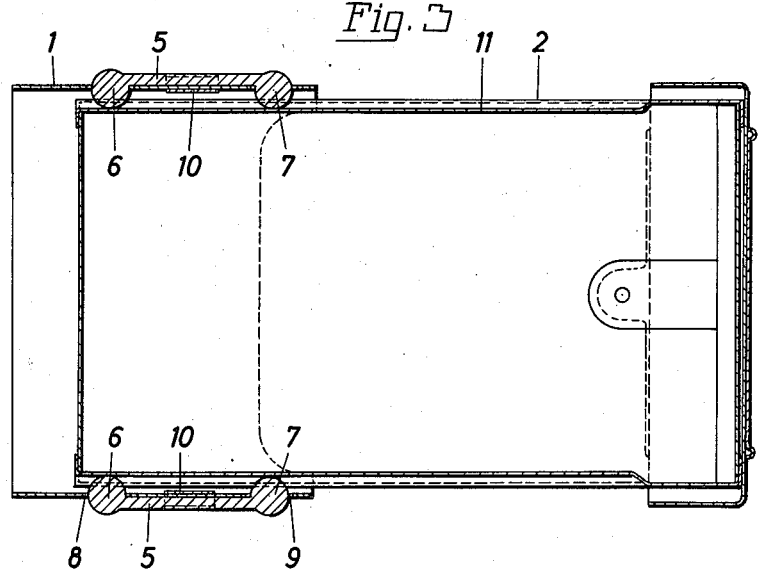
Fig. 3 is a section along the lines 3—3 of Fig. 1.
Figure 2:
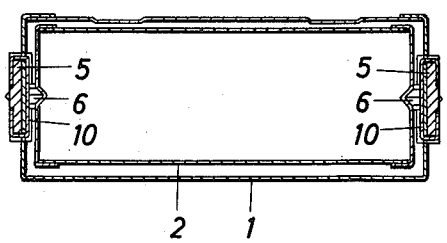
Fig. 2 is a section along the lines 2—2 of Fig. 1.

Referring now to the drawings, and in particular to Figs. 1 to 3, in which one of the embodiments of the ash-tray is disclosed, the latter comprises a housing 1 and an ash-tray 2 which is mounted for longitudinal movement, as a drawer in the tunnel-shaped housing 1. The sliding out movement is limited in forward direction by a cranked spring blade 3, which is disposed in a recess of the cover of the housing 1.

By pressing down the free end 4 of the spring blade 3, the ash-tray 2 may be removed completely from the housing 1 for instance for cleaning of the ash-tray.

A plate 5 of artificial material is disposed on both side walls of the housing 1, which plate 5 is formed at its free ends to skid-like projections and nose portions 6 and 7. These skid-like projections penetrate through the perforations 8 and 9 provided in the side walls of the housing 1 and thus project inside of the tunnel-shaped housing 1.

The plate 5 of artificial material is clamped to the side wall of the housing 1 at its center portion by means of a clamp 10.

The ash-tray 2 has on each side of its side walls a guide groove 11, which corresponds in its cross-section substantially to the shape of the skid-like projections 6 and 7.

The guide grooves 11 are disposed on the side walls of the ash-tray in such a manner that during insertion of the ash-tray 2 into the housing 1 the skid-like projections 6 and 7 engage the corresponding groove 11 disposed on the same side as said projections.

In order to simplify the insertion of the ash-tray, each of the guide grooves 11 is enlarged funnel-like at its rear end 12.

The skid-like projections 6 and 7 penetrate so far that they are pushed outwardly upon engagement with the guide grooves 11 for a predetermined amount. This pressing outwardly is assumed by an elasticity of the plate 5 of artificial material and causes, due to the central clamping by means of the clamp 10, a continuous pressing on to the ash-tray 2 of the skid-like projections 6 and 7.

Referring now again to the drawings, in particular to Figs. 4 to 6 where another embodiment of the present invention is disclosed, the structure comprises again a housing 21 and an ash-tray 22, which is mounted like a drawer in the tunnel-shaped housing 21. This sliding movement is limited in a forward direction by means of a cranked spring blade 23 which enters a recess of the cover of the housing 21. By pressing down this spring blade 23, the ash-tray 22 may be removed completely from the housing 21 for instance for cleaning of the ash-tray 22.

The housing 21 is secured to the vehicle body or, preferably, in the dash board of a motor vehicle and in particular by securing the same to the angle iron 24.

A plate 25 is arranged on both side walls of the housing 21, which plate 25 is formed at its free ends to skid-like projections 27 and 27'. The skid-like projections penetrate through perforations 28 and 29 provided in the side walls of the housing 21 and project to the inside of the tunnel-shaped housing 21.

A spring blade 26 engages with its wide face the back side of the plate 25 of artificial material. The outer measurements of the blade spring 26 correspond with those of the plate 25.

The plate 25 of artificial material as well as the spring blade 26 are clamped to the side walls of the housing 21 by means of a common clamp 30. These clamps 30 are formed of flanges which are cut out from the side walls of the housing 21.

The spring blade 26 engages the plate 25 with a pretension. This pre-tension is created by a waved-shape of the spring blade 26 in its relaxed position. The wave is concave towards the plate 25. By central clamping of such a spring blade a constant spring pressure is created towards the plate 25. The projections 27 and 27' of the plate 25 are pressed to the inside of the tunnel-shaped housing 21 due to the spring tension with the spring force of the spring blade 26 in addition to the spring force of the plate 25 itself.

The ash-tray 22 has a guide groove 31 on each of its side walls, which corresponds with its cross-section substantially the shape of the skid-like projections 27 and 27'.

The guide grooves 31 are arranged on the side walls of the ash-tray 22 in such a manner that upon insertion of the ash-tray 22 into the housing 21, the skid-like projections 27 and 27' enter the corresponding guide groove 31 disposed on the same side opposite said projections 27 and 27', respectively.

In order to simplify the insertion of the ash-tray 22 into the housing 21, each of the guide grooves 31 has a funnel-like enlargement at its rear end 32.

While I have disclosed several embodiments of the present invention, it is to be understood, that these embodiments are given by example only and not in a limiting sense, the scope of the present invention being determined by the objects and the claims.

I claim:

1. An ash-tray structure for motor vehicles or the like, comprising a housing and an ash-tray slidably received by said housing, and having guide grooves in the side walls thereof, a plate disposed adjacent to and outside of each of the side walls of said housing and the latter having a plurality of nose-like projections received by said guide grooves, and said plate being made of self-lubricating material, and means for clamping each of said plates at its central portion to the corresponding one of the side walls of said housing, said side walls of the housing having perforations longitudinally spaced apart at a predetermined distance, and the free ends of each of said plates forming skid-like projections to engage said guide grooves of said ash-tray.

2. The ash-tray structure, as set forth in claim 1, wherein said skid-like projections penetrate through said perforations of said housing.

3. The ash-tray structure, as set forth in claim 1, wherein said clamping means comprises a portion cut out of the side walls of said housing.

4. The ash-tray structure, as set forth in claim 1, which includes a spring blade disposed adjacent to and engaging with pre-tension the back face of each of said plates and supporting the latter with its wide face.

5. The ash-tray structure, as set forth in claim 4, wherein said clamping means clamp said plates jointly with the corresponding one of said spring blades to said respective side walls of said housing.

References Cited in the file of this patent

UNITED STATES PATENTS

| 1,846,512 | Dike | Feb. 23, 1932 |
| 2,462,397 | Hendricks | Feb. 22, 1949 |
| 2,606,091 | Buchy | Aug. 5, 1952 |
| 2,751,272 | Hutzelman | June 19, 1956 |
| 2,793,092 | Peterson | May 21, 1957 |
| 2,809,877 | Hammesfahr | Oct. 15, 1957 |